(12) United States Patent
Ji et al.

(10) Patent No.: US 10,506,500 B2
(45) Date of Patent: Dec. 10, 2019

(54) METHOD, USER EQUIPMENT, AND ACCESS NETWORK DEVICE FOR OFFLOADING 3GPP TRAFFIC TO AN AUTHORIZED WLAN OPERATOR

(71) Applicant: Huawei Technologies Co., Ltd., Shenzhen (CN)

(72) Inventors: Li Ji, Shanghai (CN); Hongzhuo Zhang, Shanghai (CN); Huan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 331 days.

(21) Appl. No.: 15/224,192

(22) Filed: Jul. 29, 2016

(65) Prior Publication Data

US 2016/0337953 A1 Nov. 17, 2016

Related U.S. Application Data (63) Continuation of application No. PCT/CN2014/071782, filed on Jan. 29, 2014.

(51) Int. Cl.
*H04W 48/16* (2009.01)
*H04W 28/02* (2009.01)
(Continued)

(52) U.S. Cl.
CPC ....... *H04W 48/16* (2013.01); *H04W 28/0284* (2013.01); *H04W 28/08* (2013.01); *H04W 84/12* (2013.01)

(58) Field of Classification Search
CPC .................................................. H04W 48/16
See application file for complete search history.

(56) References Cited

U.S. PATENT DOCUMENTS

2009/0238114 A1* 9/2009 Deshpande .......... H04J 11/0069
370/328
2014/0148165 A1* 5/2014 Serravalle ............. H04W 16/14
455/436
(Continued)

FOREIGN PATENT DOCUMENTS

| CN | 101699890 A | 4/2010 |
| CN | 103476004 A | 12/2013 |
| GB | 2490968 A | 11/2012 |

OTHER PUBLICATIONS

"Load Balancing between 3GPP and WLAN," 3GPP TSG-RAN2 Meeting #81bis, Chicago, Illinois, R2-131181, 3rd Generation Partnership Project, Valbonne, France (Apr. 15-19, 2013).
(Continued)

*Primary Examiner* — Jason E Mattis
(74) *Attorney, Agent, or Firm* — Leydig, Voit & Mayer, Ltd.

(57) ABSTRACT

The present application relates to a service transfer method, user equipment, and an access network device. The method includes: receiving, by user equipment, a public land mobile network identity PLMN ID and auxiliary information corresponding to the PLMN ID that are sent by a 3GPP access network entity, where the auxiliary information corresponding to the PLMN ID is used by the user equipment to perform service transfer to a wireless local area network WLAN that an operator corresponding to the PLMN ID allows the user equipment to access; and performing, by the user equipment, service transfer according to the PLMN ID and the auxiliary information corresponding to the PLMN ID. Technical solutions provided in embodiments of the present invention may increase a success rate of service transfer.

8 Claims, 6 Drawing Sheets

(51) Int. Cl.
*H04W 28/08* (2009.01)
*H04W 84/12* (2009.01)

(56) References Cited

U.S. PATENT DOCUMENTS

| | | | | |
|---|---|---|---|---|
| 2014/0295843 | A1* | 10/2014 | Van Der Velde | H04W 36/22 455/436 |
| 2015/0327110 | A1* | 11/2015 | Jeong | H04W 48/20 370/338 |
| 2016/0020890 | A1* | 1/2016 | Sirotkin | H04W 4/70 370/352 |
| 2016/0295483 | A1* | 10/2016 | Jung | H04W 28/08 |

OTHER PUBLICATIONS

"Considerations on WLAN interworking solution 1 for deployment without ANDSF," 3GPP TSG RAN WG2 Meeting #83, Barcelona, Spain, R2-132882, $3^{rd}$ Generation Partnership Project, Valbonne, France (Aug. 19-23, 2013).

"RAN assistance on ANDSF information provisioning," 3GPP TSG-RAN WG2 Meeting #83bis, Ljublijana, Slovenia, R2-133340, $3^{rd}$ Generation Partnership Project, Valbonne, France (Oct. 7-11, 2013).

"$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 12)," 3GPP TS 23.401, V12.3.0, pp. 1-302, $3^{rd}$ Generation Partnership Project, Valbonne, France (Dec. 2013).

"$3^{rd}$ Generation Partnership Project; Technical Specification Group Radio Access Network; Evolved Universal Terrestrial Radio Access (E-UTRA); Radio Resource Control (RRC); Protocol specification (Release 12)," 3GPP TS 36.331, V12.0.0, pp. 1-349, $3^{rd}$ Generation Partnership Project, Valbonne, France, (Dec. 2013).

* cited by examiner

METHOD, USER EQUIPMENT, AND ACCESS NETWORK DEVICE FOR OFFLOADING 3GPP TRAFFIC TO AN AUTHORIZED WLAN OPERATOR

CROSS-REFERENCE TO RELATED APPLICATIONS

This application is a continuation of International Application No. PCT/CN2014/071782, filed on Jan. 29, 2014, which is hereby incorporated by reference in its entirety.

TECHNICAL FIELD

The present invention relates to the field of mobile communications, and in particular, to a service transfer method, user equipment, and an access network device.

BACKGROUND

Currently, a non The 3rd Generation Partnership Project (non-3GPP) network (such as a wireless local area network (WLAN)) may be used to offload some or all services of a 3GPP network (for example, a Long Term Evolution (LTE) network), so as to lighten service traffic load of the 3GPP network. User equipment (User Equipment, UE) may access an LTE network and a WLAN at the same time, and the LTE network may control resource scheduling of the WLAN, which implements that some or all services of the UE in the 3GPP network are offloaded to the WLAN. During service offloading, the UE may receive auxiliary information delivered by an access network discovery and selection function (ANDSF) or a 3GPP radio access network (RAN), where the auxiliary information is used by the user equipment to perform service transfer to a WLAN that an operator allows the user equipment to access. The UE may access a corresponding WLAN according to the offloading policy and the auxiliary information, and perform service transfer, thereby achieving an effect of service offloading.

Access network sharing indicates that a 3GPP radio access network (also called 3GPP access network in the following description) of an operator is shared by another operator. The operators deliver auxiliary information to UE by using a same shared 3GPP access network. However, in this network sharing case, each operator may set different auxiliary information for UE that belongs to the operator; therefore, when user equipment receives multiple pieces of different auxiliary information delivered by the 3GPP access network, service transfer may fail because the user equipment cannot identify that the received auxiliary information is respectively corresponding to which operators.

SUMMARY

Embodiments of the present invention provide a service transfer method and apparatus, which may increase a success rate of service transfer.

A first aspect of an embodiment of the present invention provides a service transfer method, where the method includes:

receiving, by user equipment, a public land mobile network identity (public land mobile network identity, PLMN ID) and auxiliary information corresponding to the PLMN ID that are sent by a 3GPP access network entity, where the auxiliary information corresponding to the PLMN ID is used by the user equipment to perform service transfer to a wireless local area network WLAN that an operator corresponding to the PLMN ID allows the user equipment to access; and performing, by the user equipment, service transfer according to the PLMN ID and the auxiliary information corresponding to the PLMN ID.

Based on the first aspect, in a first possible implementation manner of the first aspect, the PLMN ID includes:

a PLMN ID of a first operator to which the 3GPP access network entity belongs; or a PLMN ID of a first operator to which the 3GPP access network entity belongs and a PLMN ID of a second operator that shares the 3GPP access network entity with the first operator.

Based on the first aspect or the first possible implementation manner of the first aspect, in a second possible implementation manner of the first aspect, the performing, by the user equipment, service transfer according to the PLMN ID and the auxiliary information corresponding to the PLMN ID includes:

when the PLMN ID includes a PLMN ID of a home operator of the user equipment, determining, by the user equipment, auxiliary information corresponding to the PLMN ID of the home operator from the auxiliary information corresponding to the PLMN ID; and performing, by the user equipment, service transfer according to the auxiliary information corresponding to the PLMN ID of the home operator.

A second aspect of an embodiment of the present invention provides a service transfer apparatus, where the apparatus includes:

a receiver, configured to receive a public land mobile network identity PLMN ID and auxiliary information corresponding to the PLMN ID that are sent by a 3GPP access network entity, where the auxiliary information corresponding to the PLMN ID is used by the user equipment to perform service transfer to a wireless local area network WLAN that an operator corresponding to the PLMN ID allows the user equipment to access; and a processor, configured to perform service transfer according to the PLMN ID and the auxiliary information corresponding to the PLMN ID.

Based on the second aspect, in a first possible implementation manner of the second aspect, the PLMN ID includes:

a PLMN ID of a first operator to which the 3GPP access network entity belongs; or a PLMN ID of a first operator to which the 3GPP access network entity belongs and a PLMN ID of a second operator that shares the 3GPP access network entity with the first operator.

Based on the second aspect or the first possible implementation manner of the second aspect, in a second possible implementation manner of the second aspect, that the processor is configured to perform service transfer according to the PLMN ID and the auxiliary information corresponding to the PLMN ID includes:

the processor is configured to: when the PLMN ID includes a PLMN ID of a home operator of the user equipment, determine auxiliary information corresponding to the PLMN ID of the home operator from the auxiliary information corresponding to the PLMN ID, and perform service transfer according to the auxiliary information corresponding to the PLMN ID of the home operator.

A third aspect of an embodiment of the present invention provides a service transfer method, where the method includes:

receiving, by a 3GPP access network entity, auxiliary information that is corresponding to a public land mobile network identity PLMN ID and sent by a core network device or a network management system, where the auxiliary information corresponding to the PLMN ID is used by the user equipment to perform service transfer to a wireless local area network WLAN that the operator allows the user equipment to access; and sending, by the 3GPP access network entity, the PLMN ID and the auxiliary information corresponding to the PLMN ID to the user equipment, so that the user equipment performs service transfer according to the PLMN ID and the auxiliary information corresponding to the PLMN ID.

A fourth aspect of an embodiment of the present invention provides an access network device, including:

a receiver, configured to receive auxiliary information that is corresponding to a public land mobile network identity PLMN ID and sent by a core network device or a network management system, where the auxiliary information corresponding to the PLMN ID is used by the user equipment to perform service transfer to a wireless local area network WLAN that the operator allows the user equipment to access; and a transmitter, configured to send the PLMN ID and the auxiliary information corresponding to the PLMN ID to the user equipment, so that the user equipment performs service transfer according to the PLMN ID and the auxiliary information corresponding to the PLMN ID.

According to the service transfer method, the user equipment, and the access network device provided in the embodiments of the present invention, a 3GPP access network entity associates a PLMN ID used to identify an operator with auxiliary information corresponding to the PLMN ID and delivers them to the user equipment, so that the user equipment can identify that the received auxiliary information is corresponding to which operator, and can perform operator-specific service transfer, which increases a success rate of service transfer. Furthermore, when the PLMN ID delivered by the 3GPP access network entity includes a PLMN ID of a home operator of the user equipment, the user equipment can perform service transfer according to identified auxiliary information that is corresponding to the home operator, which may avoid a case that service transfer fails because the user equipment performs service transfer by using auxiliary information corresponding to a non home operator, and further increase the success rate of service transfer.

DESCRIPTION OF EMBODIMENTS

The following further describes the technical solutions of the present invention in detail by using accompanying drawings and embodiments.

Figure 1:
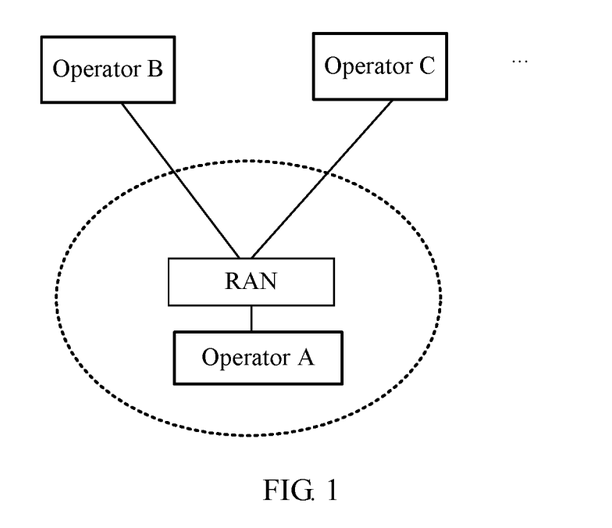
FIG. 1 is a schematic diagram of a network structure for sharing an access network in a mobile communications system according to the present invention.

Refer to FIG. 1 for a schematic diagram of a network structure for sharing a 3GPP access network in a mobile communications system according to an embodiment of the present invention. Operators A, B, and C share a same 3GPP access network, and operators A, B, and C have their respective public land mobile network identities (PLMN ID). Based on the network structure, in this embodiment of the present invention, a 3GPP access network entity may deliver, in a system broadcast message, the PLMN IDs and auxiliary information respectively corresponding to the PLMN IDs, and user equipment may determine auxiliary information corresponding to each operator, and perform operator-specific service transfer.

In FIG. 1, network sharing scenarios include but are not limited to the following two:

Network sharing scenario 1: Only a 3GPP access network of an operator is shared. For example, operators A, B, and C share a 3GPP access network of operator A (what is specifically shared is a 3GPP access network entity, where the 3GPP access network entity may be a base station or a base station controller). In addition, operator A may have a WLAN controlled by operator A, neither of operators B and C has a controlled WLAN, and operator A does not share the WLAN controlled by operator A with operator B and operator C; or it may be possible that operator A, operator B, and operator C have their respective WLANs, but do not share the WLANs with each other.

Network sharing scenario 2: Both a 3GPP access network and a WLAN of an operator are shared. For example, operators A, B, and C share a 3GPP access network of operator A, and one or more WLANs controlled by only operator A exist within network coverage of the 3GPP access network. Operator A shares the one or more WLANs with operator B and operator C for use. Alternatively, it may be possible that a WLAN controlled by operator A, a WLAN controlled by operator B, and a WLAN controlled operator C exist within network coverage of the 3GPP access network; operator A shares the controlled WLAN with operators B and C, operator B shares the controlled WLAN with operators A and C, and operator C shares the controlled WLAN with operators B and A.

In this embodiment of the present invention, in a process that the user equipment performs service transfer, a 3GPP network may send, to the user equipment, various types of information for service transfer in at least the following two manners:

(1) An ANDSF delivers network selection and routing information, and a preset condition to the user equipment, and a 3GPP access network entity of operator A delivers auxiliary information in a broadcast manner or a dedicated signaling manner.

(2) An ANDSF delivers network selection and routing information to the user equipment, and a 3GPP access network entity of operator A delivers auxiliary information and a preset condition in a broadcast manner or a dedicated signaling manner.

It should be noted that the above-mentioned network selection and routing information includes: a type of an access network, such as a WLAN; or a radio access network identifier, such as a WLAN identifier (such as an SSID (service set identifier), a BSSID (basic service set identifier), or an ESSID (extended service set identifier)); or priority information among 3GPP access networks of different operators, priority information among different WLAN access points, or the like. The above-mentioned preset condition is a condition for service transfer of the user equipment. For example, when a signal quality value of a 3GPP access network satisfies some conditions (for example, less than a signal quality threshold of the 3GPP access network) or a signal quality value of a WLAN satisfies some conditions (for example, less than a signal quality threshold of the WLAN), the UE transfers some or all services to the WLAN. The preset condition may also be a condition that another network parameter satisfies. A signal quality value is used as an example for description in this embodiment of the present invention. The foregoing auxiliary information is used by the user equipment to perform service transfer to a WLAN that an operator allows the user equipment to access. The auxiliary information may further specifically include a signal quality threshold of a 3GPP access network and a signal quality threshold of a WLAN.

According to the present invention, in an access network sharing scenario, PLMN IDs are delivered when auxiliary information is delivered, where the PLMN IDs are respectively corresponding to auxiliary information that is delivered by an access network entity and that is configured by each operator. For example, a PLMN ID of operator A is corresponding to auxiliary information configured by operator A, and a PLMN ID of operator B is corresponding to auxiliary information configured by operator B, thereby ensuring that in the two scenarios in FIG. 1, user equipment can identify different auxiliary information configured by different operators, which avoids a problem that service transfer fails because the user equipment cannot identify auxiliary information that is configured by multiple operators and sent by a same 3GPP access network entity shared by the multiple operators.

Figure 2:
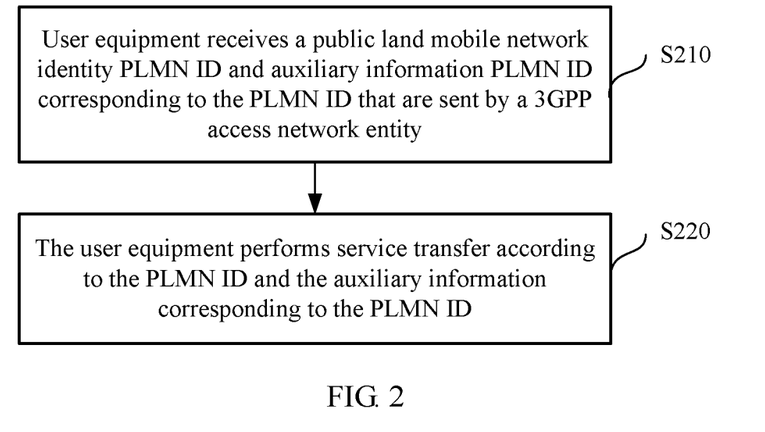
FIG. 2 is a flowchart of a service transfer method according to a first embodiment of the present invention.

FIG. 2 is a flowchart of a service transfer method according to a first embodiment of the present invention. As shown in FIG. 2, the method specifically includes the following steps:

S210. User equipment receives a public land mobile network identity PLMN ID and auxiliary information corresponding to the PLMN ID that are sent by a 3GPP access network entity, where the auxiliary information corresponding to the PLMN ID is used by the user equipment to perform service transfer to a wireless local area network WLAN that an operator corresponding to the PLMN ID allows the user equipment to access.

The 3GPP access network entity may send a correspondence between at least one PLMN ID and auxiliary information respectively corresponding to the at least one PLMN ID to the user equipment in a broadcast manner. In a possible implementation manner, the 3GPP access network entity sends the correspondence to the user equipment in a list manner. In the list, one PLMN ID is corresponding to one piece of auxiliary information, where the auxiliary information may be auxiliary information configured by an operator corresponding to the PLMN ID. The PLMN ID sent by the 3GPP access network entity may include a PLMN ID of an operator to which the user equipment belongs; correspondingly, the auxiliary information that is corresponding to the PLMN ID and sent by the 3GPP access network entity may include auxiliary information configured by the operator to which the user equipment belongs. The PLMN ID sent by the 3GPP access network entity may not include the PLMN ID of the operator to which the user equipment belongs; correspondingly, the auxiliary information that is corresponding to the PLMN ID and sent by the 3GPP access network entity may not include the auxiliary information configured by the operator to which the user equipment belongs.

In S210 and subsequent embodiments, the auxiliary information that is corresponding to the PLMN ID and sent by the 3GPP access network entity to the user equipment may be configured by a network management system (for example, an operation, administration and maintenance (OAM) system) or a core network device according to a policy of an operator. The 3GPP access network entity may receive a PLMN ID and auxiliary information corresponding to the PLMN ID that are sent by the core network device or the OAM system, and forward the PLMN ID and the auxiliary information corresponding to the PLMN ID to the user equipment.

S220. The user equipment performs service transfer according to the PLMN ID and the auxiliary information corresponding to the PLMN ID.

In the foregoing method, the user equipment may determine whether the PLMN ID delivered by the 3GPP access network entity includes a PLMN ID of a home operator of the user equipment.

When the PLMN ID delivered by the 3GPP access network entity includes the PLMN ID of the home operator of the user equipment, that the user equipment performs service transfer according to the PLMN ID and the auxiliary information that is corresponding to the PLMN ID and sent by the 3GPP access network entity includes:

The user equipment determines auxiliary information corresponding to the PLMN ID of the home operator of the user equipment from the auxiliary information corresponding to the PLMN ID sent by the 3GPP access network entity; and the user equipment performs service transfer according to the auxiliary information corresponding to the PLMN ID of the home operator.

When the PLMN ID delivered by the 3GPP access network entity does not include the PLMN ID of the home operator of the user equipment, that the user equipment performs service transfer according to the PLMN ID and the auxiliary information that is corresponding to the PLMN ID and sent by the 3GPP access network entity includes:

The user equipment performs service transfer without considering the PLMN ID and the auxiliary information corresponding to the PLMN ID that are sent by the 3GPP access network entity.

Optionally, the PLMN ID includes: a PLMN ID of a first operator to which the 3GPP access network entity belongs; or a PLMN ID of a first operator to which the 3GPP access network entity belongs and a PLMN ID of a second operator that shares the 3GPP access network entity with the first operator. It should be noted that the first operator and the second operator herein generally refer to two different operators.

The PLMN ID sent by the 3GPP access network entity may include a PLMN ID of one or more operators to which the 3GPP access network entity belongs, where the multiple operators may share the 3GPP access network entity or may not.

The PLMN ID sent by the 3GPP access network entity to the user equipment may also include a PLMN ID of at least one operator to which the 3GPP access network entity belongs. For example, in a case of the foregoing network sharing scenario 1, a 3GPP access network entity of operator A may deliver only a PLMN ID of operator A and auxiliary information corresponding to the PLMN ID. However, in a case of the foregoing network sharing scenario 2, a 3GPP access network entity of operator A may send two or more PLMN IDs and corresponding auxiliary information, that is, a PLMN ID of a first operator (assumed to be operator A) to which the 3GPP access network entity belongs and a PLMN ID of a second operator (assumed to be operator B) that shares the 3GPP access network entity with the first operator. The user equipment receives the PLMN ID of operator A and the PLMN ID of operator B. Because operator A and operator B share the same 3GPP access network entity, the user equipment determines which one of the PLMN ID of operator A and the PLMN ID of operator B that are delivered by the 3GPP access network entity is a PLMN ID of a home operator of the user equipment, ignores a PLMN ID of a non home operator, and performs service transfer according to auxiliary information corresponding to the PLMN ID of the home operator. If neither operator A nor operator B is the home operator of the user equipment, the user equipment may ignore auxiliary information corresponding to the PLMN ID of operator A and auxiliary information corresponding to the PLMN ID of operator B.

Optionally, the foregoing auxiliary information may include a signal quality threshold of a 3GPP access network and/or signal quality thresholds of one or more WLANs that an operator allows the user equipment to access.

Correspondingly, the user equipment performs service transfer according to the foregoing auxiliary information in at least the following two service transfer manners:

(1) When a current signal quality value of a 3GPP access network that serves the user equipment is less than a signal quality threshold of the 3GPP access network, a wireless local area network of which a signal quality value is greater than a signal quality threshold of the WLAN is selected as a target wireless local area network, and all services or some services of the user equipment are transferred to the target wireless local area network.

(2) To achieve an objective of service offloading, it may not be considered whether a current signal quality value of a 3GPP access network that serves the user equipment is less than a signal quality threshold of the 3GPP access network, and the user equipment may still select one WLAN of which the current signal quality value is greater than a signal quality threshold of the WLAN as a target WLAN, and transfer all services or some services of the user equipment to the target wireless local area network.

Optionally, the foregoing auxiliary information also includes a load threshold of the 3GPP access network and signal quality thresholds of one or more WLANs that an operator allows the user equipment to access. Correspondingly, that the user equipment performs service transfer according to the foregoing auxiliary information includes:

When current load of a 3GPP access network that serves the user equipment is higher than a load threshold of the 3GPP access network, the user equipment selects one WLAN of which a signal quality value is greater than a signal quality threshold of the WLAN as a target wireless local area network, and transfers all services or some services to the target wireless local area network.

Auxiliary information in the following embodiments includes a signal quality threshold of a 3GPP access network and/or signal quality thresholds of one or more wireless local area networks that an operator allows the user equipment to access.

Figure 3:
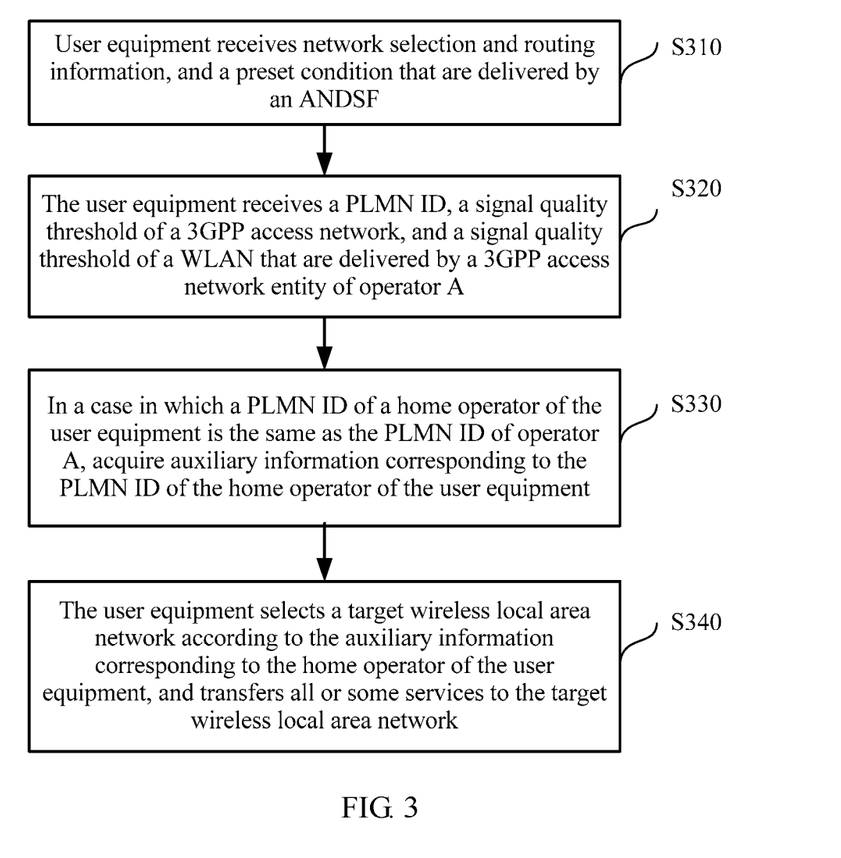
FIG. 3 is a flowchart of a service transfer method according to a second embodiment of the present invention.

FIG. 3 is a flowchart of a service transfer method according to a second embodiment of the present invention. The method is applicable to the above-mentioned scenario 1, and a 3GPP access network of operator A delivers auxiliary information in a broadcast manner, where the auxiliary information includes a signal quality threshold of the 3GPP access network and a signal quality threshold of a WLAN, and the method specifically includes the following steps:

S310. User equipment receives network selection and routing information, and a preset condition that are delivered by an ANDSF.

Specifically, operators A, B, and C share a 3GPP access network entity of operator A, and user equipment of each operator receives network selection and routing information, and a preset condition that are delivered by an ANDSF of each operator. The preset condition includes that when a signal quality value of the 3GPP access network of operator A is less than the signal quality threshold of the 3GPP access network and a signal quality value of a WLAN controlled by operator A is greater than a signal quality threshold of the WLAN, the UE can perform service transfer, that is, the UE transfers all services or some services to the WLAN.

S320. The user equipment receives a PLMN ID, a signal quality threshold of a 3GPP access network, and a signal quality threshold of a WLAN that are delivered by a 3GPP access network entity of operator A.

It should be noted that when the 3GPP access network needs to deliver signal quality thresholds of multiple WLANs, and the signal quality thresholds are different from each other, the 3GPP access network may deliver the different signal quality thresholds for the multiple WLANs. In this embodiment, it is assumed that the PLMN ID sent by the 3GPP access network entity is corresponding to operator A, operator A shares the 3GPP access network entity with operators B and C, but at least one WLAN controlled by operator A is not shared by operators B and C. Then, the 3GPP access network delivers the PLMN ID of operator A, the signal quality threshold of the 3GPP access network, and signal quality thresholds of one or more WLANs in a broadcast manner. For example, the 3GPP access network entity sends auxiliary information to the UE. The auxiliary information includes signal quality thresholds of three WLANs that operator A allows the user equipment to access, the signal quality thresholds of the three WLANs are respectively corresponding to the three WLANs, and the three WLANs may be identified by using SSIDs, BSSIDs, or ESSIDs. For example, when being used for identifying, the SSIDs may be respectively represented as an SSID1, an SSID2, and an SSID3. The 3GPP access network of operator A may broadcast the auxiliary information in the following manner:

{PLMN ID=A, signal quality threshold of the 3GPP access network, signal quality threshold of the SSID1, signal quality threshold of the SSID2, signal quality threshold of the SSID3}, where, PLMN ID=A is the PLMN ID of operator A; the SSID1, the SSID2, and the SSID3 are respectively IDs of the three WLANs controlled by operator A. The foregoing signal quality thresholds of the SSID1, the SSID2, and the SSID3 may be the same or may be different.

It should be noted that when the signal quality thresholds of the WLANs are the same, and operator A has only the three WLANs, to simplify delivered information, the 3GPP access network entity may not deliver a signal quality threshold for each SSID, but delivers uniform auxiliary information that is {PLMN ID=A, signal quality threshold of the 3GPP access network, signal quality threshold of a WLAN}.

In addition, in another embodiment of the present invention, S320 may be performed before S310 is performed, that is, a sequence of performing S310 and S320 is not limited.

S330. When a PLMN ID of a home operator of the user equipment is the same as the PLMN ID of operator A, acquire auxiliary information corresponding to the PLMN ID of the home operator of the user equipment.

Specifically, after receiving the auxiliary information delivered by the 3GPP access network, each UE of operators A, B, and C determines whether the auxiliary information is a PLMN ID of a home operator of the UE. If the PLMN ID of the home operator of the user equipment is the same as the received PLMN ID of operator A, the user equipment determines to perform service transfer according to auxiliary information corresponding to the PLMN ID of operator A; and if the PLMN ID of the home operator of the user equipment is different from the received PLMN ID of operator A, ignores the auxiliary information. For example, if user equipment of operator A identifies that the received PLMN ID is the same as a PLMN ID of a home operator of the user equipment, the user equipment acquires auxiliary information corresponding to the home operator of the user equipment from the auxiliary information sent by the 3GPP access network entity. If user equipment of operators B and C identifies that PLMN IDs of operators to which the user equipment belongs are different from all PLMN IDs sent by the 3GPP access network entity, the user equipment ignores the auxiliary information sent by the 3GPP access network entity, and does not use the auxiliary information to perform service transfer.

S340. The user equipment selects a target wireless local area network according to the auxiliary information corresponding to the home operator of the user equipment, and transfers all or some services to the target wireless local area network.

In this embodiment, if a signal quality value of a 3GPP access network that serves the user equipment is less than a signal quality threshold of the 3GPP access network, the user equipment may select a wireless local area network of which a signal quality value is greater than a signal quality threshold of the WLAN as a target wireless local area network.

It should be noted that the signal quality value of the 3GPP access network may be specifically reference signal received power (reference signal received power, RSRP) of a serving cell of the 3GPP access network, and the signal quality value of the wireless local area network may be specifically a received channel power indicator (RCPI) of the wireless local area network. Specifically, it is assumed that an RSRP value of a current serving cell of the 3GPP access network of the UE is −100 dBm, an RCPI value of the SSID1 is −95 dBm, an RCPI value of the SSID2 is −91 dBm, and an RCPI value of the SSID3 is −89 dBm, but the signal quality threshold of the 3GPP access network is −102 dBm, that is, the RSRP (−100 dBm) of the serving cell of the UE is greater than the signal quality threshold of the 3GPP access network (−102 dBm). Therefore, the UE does not satisfy a condition for service offloading. However, when the signal quality threshold of the 3GPP access network is −90 dBm, the RSRP (−100 dBm) of the serving cell of the UE is less than the signal quality threshold of the 3GPP access network (−90 dBm). In this case, it may be determined whether an RCPI value of each SSID is greater than a corresponding second signal quality threshold. In a case in which there exist multiple RCPI values satisfying the condition, the UE selects, according to network selection and routing information, a target wireless local area network from SSIDs corresponding to the multiple RCPI values satisfying the condition.

Figure 4:
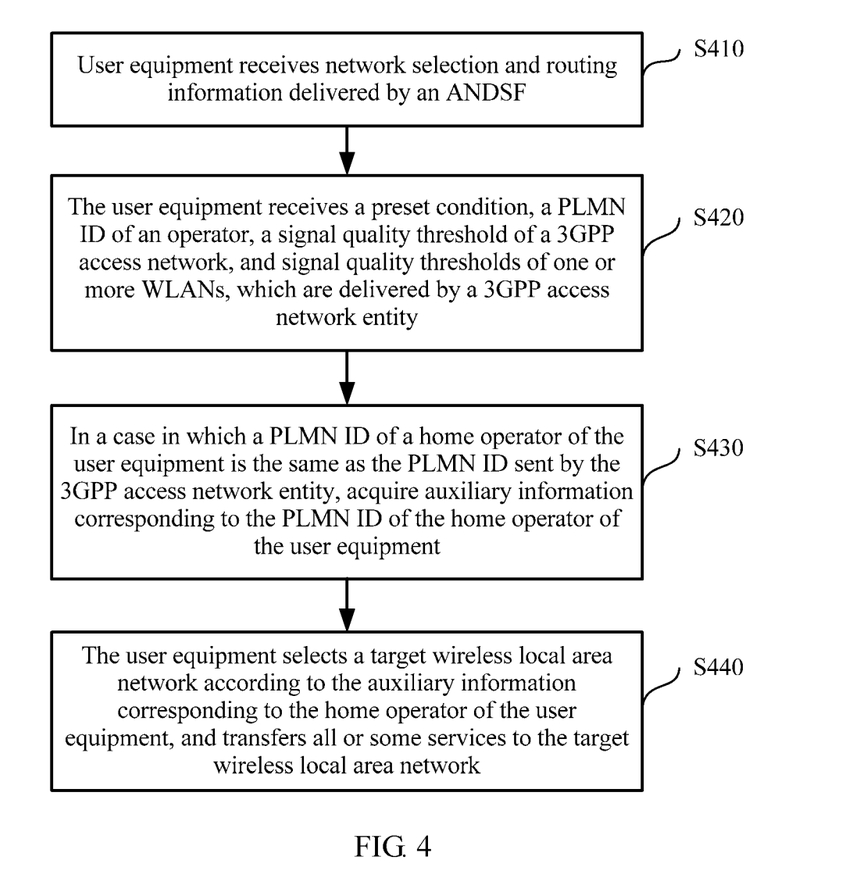
FIG. 4 is a flowchart of a service transfer method according to a third embodiment of the present invention.

FIG. 4 is a flowchart of a service transfer method according to a third embodiment of the present invention. The method is applicable to the above-mentioned scenario 1, and a 3GPP access network of operator A delivers a preset condition and auxiliary information in a broadcast manner. In FIG. 4, that the auxiliary information includes a signal quality threshold of the 3GPP access network and signal quality thresholds of one or more WLANs is used as an example for description, and the method specifically includes the following steps:

S410. User equipment receives network selection and routing information delivered by an ANDSF.

S420. The user equipment receives a preset condition, a PLMN ID of an operator, a signal quality threshold of a 3GPP access network, and signal quality thresholds of one or more WLANs that are delivered by a 3GPP access network entity.

It should be noted that the preset condition in S420 is the same as the preset condition in S310, and is not described herein again. A difference lies in that the 3GPP access network of operator A may broadcast the auxiliary information in the following manner:

{PLMN ID=A, preset condition of the 3GPP access network, signal quality threshold of the 3GPP access network, signal quality threshold of an SSID1, signal quality threshold of an SSID2, signal quality threshold of an SSID3}, where the foregoing signal quality thresholds of the SSID1, the SSID2, and the SSID3 may be the same or may be different.

In another embodiment of the present invention, S420 may be performed before S410 is performed, that is, a sequence of performing S410 and S420 is not limited.

S430 to S440 are similar to S330 to S340.

Figure 5:
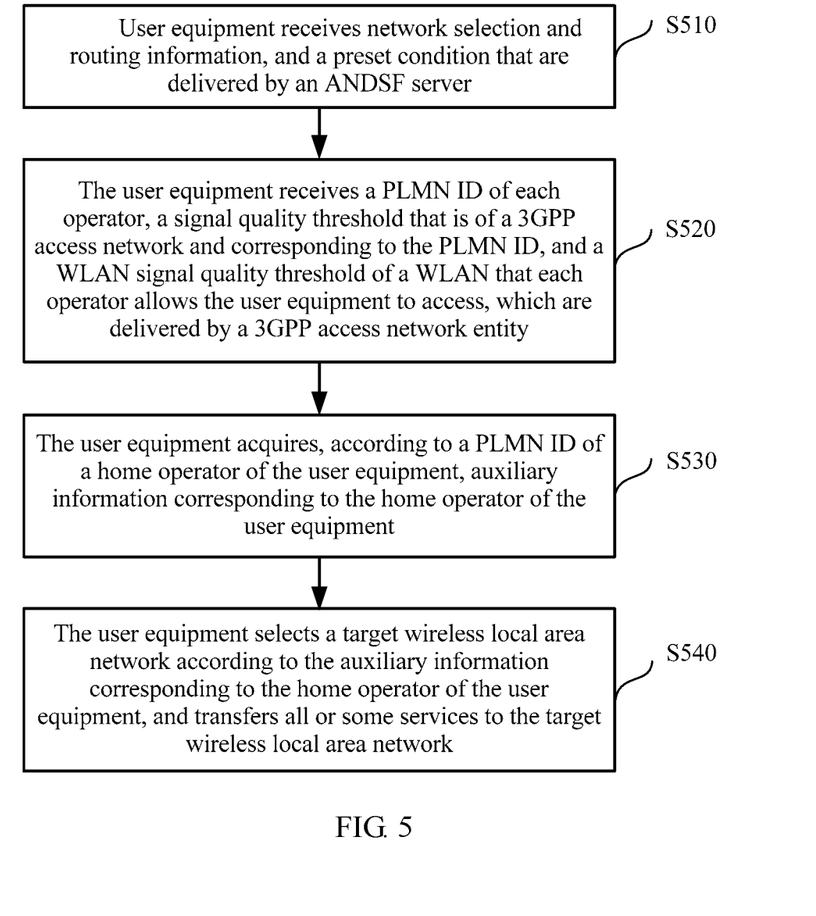
FIG. 5 is a flowchart of a service transfer method according to a fourth embodiment of the present invention.

FIG. 5 is a flowchart of a service transfer method according to a fourth embodiment of the present invention. The method is applicable to the above-mentioned network sharing scenario 2, and a 3GPP access network of operator A delivers auxiliary information in a broadcast manner, where the auxiliary information includes a signal quality threshold of the 3GPP access network and WLAN signal quality thresholds of one or more WLANs that operator A and other operators (operators B and C) allow the user equipment to access. As shown in FIG. 5, the method specifically includes the following steps:

S510. User equipment receives network selection and routing information, and a preset condition that are delivered by an ANDSF server.

It should be noted that herein the user equipment receives network selection and routing information, and a preset condition that are sent by an ANDSF server of an operator to which the user equipment belongs, where the preset condition includes that when signal quality value of a current 3GPP access network is less than the signal quality threshold of the 3GPP access network, and/or when signal quality value of a current WLAN is less than the WLAN signal quality thresholds of the one or more WLANs that the operators allow the user equipment to access, the user equipment performs service transfer.

S520. The user equipment receives a PLMN ID of each operator, a signal quality threshold that is of a 3GPP access network and corresponding to the PLMN ID, and a WLAN signal quality threshold of a WLAN that each operator allows the user equipment to access, which are delivered by a 3GPP access network entity.

For example, it is assumed that three WLANs that operator A allows the user equipment to access may be identified by using SSIDs, BSSIDs, or ESSIDs. When identified by using the SSIDs, the foregoing three WLANs may be respectively identified as an SSID1, an SSID2, and an SSID3; three WLANs that operator B allows the user equipment to access are respectively identified as an SSID4, an SSID5, and an SSID6; and three WLANs that operator C allows the user equipment to access are respectively identified as an SSID7, an SSID8, and an SSID9. The 3GPP access network of operator A may broadcast the auxiliary information in the following manner:

{PLMN ID=A, signal quality threshold that is of the 3GPP access network and set by operator A, signal quality threshold of the SSID1, signal quality threshold of the SSID2, signal quality threshold of the SSID3};

{PLMN ID=B, signal quality threshold that is of the 3GPP access network and set by operator B, signal quality threshold of the SSID4, signal quality threshold of the SSID5, signal quality threshold of the SSID6}; and {PLMN ID=C, signal quality threshold that is of the 3GPP access network and set by operator C, signal quality threshold of the SSID7, signal quality threshold of the SSID8, signal quality threshold of the SSID9}.

The foregoing signal quality thresholds that are of the 3GPP access network and set by operators A, B, and C may be the same or may be different. The signal quality thresholds of the WLANs that the operators allow the user equipment to access may be the same or may be different.

It should be noted that when signal quality thresholds of WLANs of an operator are the same, for example, operator B has only three WLANs, and signal quality thresholds of the WLANs are the same, the 3GPP access network of operator A may not deliver a signal quality threshold for each WLAN of operator B, and delivers only {PLMN ID=B, signal quality threshold that is of the 3GPP access network and set by operator B, signal quality threshold of a WLAN} to simplify an information format of the delivered auxiliary information.

In another embodiment of the present invention, S520 may be performed before S510 is performed, that is, a sequence of performing S510 and S520 is not limited.

S530. The user equipment acquires, according to a PLMN ID of a home operator of the user equipment, auxiliary information corresponding to the home operator of the user equipment.

After each UE of operators A, B, and C receives the auxiliary information delivered by the 3GPP access network, if determining that a PLMN ID of an operator to which the user equipment belongs is the same as the received PLMN ID of the operator, the user equipment applies the auxiliary information corresponding to the PLMN ID to perform service transfer. For example, after UE of operator B receives the foregoing auxiliary information, because PLMN IDs of operators A and C are different from an identity of home operator B of the user equipment, the auxiliary information corresponding to PLMN ID=A or PLMN ID=C is ignored. However, the user equipment may select a target wireless local area network according to auxiliary information corresponding to PLMN ID=B, which is similar to the method for selecting a target wireless local area network in S330, and is not described herein again.

S540. The user equipment selects a target wireless local area network according to the auxiliary information corresponding to the home operator of the user equipment, and transfers all or some services to the target wireless local area network.

Specifically, an implementation method of this step is the same as that of step S340.

Figure 6:
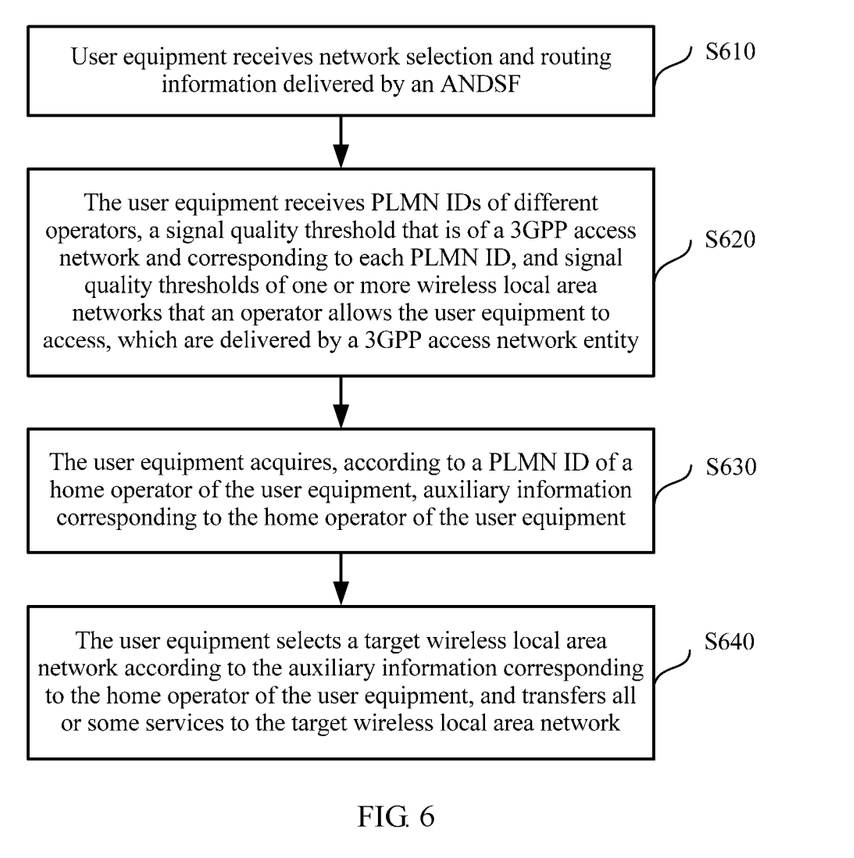
FIG. 6 is a flowchart of a service transfer method according to a fifth embodiment of the present invention.

FIG. 6 is a flowchart of a service transfer method according to a fifth embodiment of the present invention. The method is applicable to the above-mentioned scenario 2, and a 3GPP access network of operator A delivers auxiliary information and a preset condition in a broadcast manner. In FIG. 6, that the auxiliary information includes signal quality thresholds that are of the 3GPP access network and configured by different operators and WLAN signal quality thresholds of one or more WLANs that an operator allows the user equipment to access is used as an example for description, and the method specifically includes the following steps:

S610. User equipment receives network selection and routing information delivered by an ANDSF.

S620. The user equipment receives PLMN IDs of different operators, a signal quality threshold that is of a 3GPP access network and corresponding to each PLMN ID, and signal quality thresholds of one or more wireless local area networks that an operator allows the user equipment to access, which are delivered by a 3GPP access network entity.

A 3GPP access network entity of operator A may broadcast the auxiliary information in the following manner:

{PLMN ID=A, preset condition that is of the 3GPP access network and set by operator A, signal quality threshold that is of the 3GPP access network and set by operator A, signal quality threshold of an SSID1, signal quality threshold of an SSID2, signal quality threshold of an SSID3;

PLMN ID=B, preset condition that is of the 3GPP access network and set by operator B, signal quality threshold that is of the 3GPP access network and set by operator B, signal quality threshold of an SSID4, signal quality threshold of an SSID5, signal quality threshold of an SSID6; and PLMN ID=C, preset condition that is of the 3GPP access network and set by operator C, signal quality threshold that is of the 3GPP access network and set by operator C, signal quality threshold of an SSID7, signal quality threshold of an SSID8, signal quality threshold of an SSID9}.

In another embodiment of the present invention, S620 may be performed before S610 is performed, that is, a sequence of performing S610 and S620 is not limited.

S630 to S640 are the same as S530 to S540.

It should be noted that although a signal quality threshold in auxiliary information is used as an example for illustration in the foregoing embodiments, the present invention is not limited thereto, and the signal quality threshold in the foregoing embodiments may be replaced with another information value.

In conclusion, according to the service transfer method provided in the embodiments of the present invention, a PLMN ID and auxiliary information corresponding to the PLMN ID are associated together and sent to user equipment (or a correspondence between a PLMN ID and auxiliary information corresponding to the PLMN ID is sent to the user equipment), and the user equipment can identify, by using the PLMN ID, that the auxiliary information is corresponding to which operator, which avoids a service transfer failure caused by that the user equipment cannot learn auxiliary information of an operator to which the user equipment belongs, and increases a success rate of service transfer.

Figure 7:
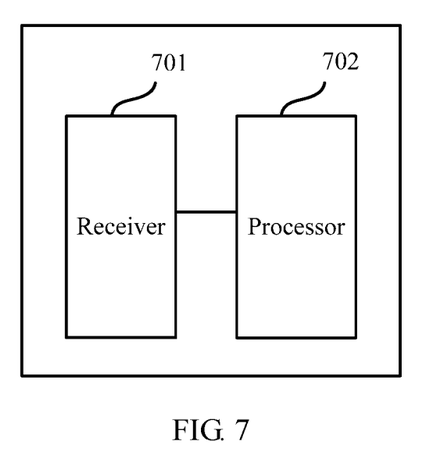
FIG. 7 is a schematic diagram of a service transfer apparatus according to a sixth embodiment of the present invention.

FIG. 7 is a schematic diagram of a service transfer apparatus according to a sixth embodiment of the present invention. The apparatus is user equipment, and may be configured to perform an action performed by user equipment in any one of the methods in FIG. 2 to FIG. 6. For a same or similar concept and process, refer to the foregoing method embodiments; details are not described herein again in this embodiment. As shown in FIG. 7, the apparatus includes a receiver 701 and a processor 702.

The receiver 701 is configured to receive a public land mobile network identity PLMN ID and auxiliary information corresponding to the PLMN ID that are sent by a 3GPP access network entity, where the auxiliary information corresponding to the PLMN ID is used by the user equipment to perform service transfer to a wireless local area network WLAN that an operator corresponding to the PLMN ID allows the user equipment to access.

The processor 702 is configured to perform service transfer according to the PLMN ID and the auxiliary information corresponding to the PLMN ID.

The processor 702 is specifically configured to acquire the auxiliary information if an identity of an operator to which the user equipment belongs matches the PLMN ID.

The PLMN ID includes: a PLMN ID of a first operator to which the 3GPP access network entity belongs; or a PLMN ID of a first operator to which the 3GPP access network entity belongs and a PLMN ID of a second operator that shares the 3GPP access network entity with the first operator.

Optionally, that the processor 702 is configured to perform service transfer according to the PLMN ID and the auxiliary information corresponding to the PLMN ID includes:

the processor is configured to: when the PLMN ID includes a PLMN ID of a home operator of the user equipment, determine auxiliary information corresponding to the PLMN ID of the home operator from the auxiliary information corresponding to the PLMN ID, and perform service transfer according to the auxiliary information corresponding to the PLMN ID of the home operator.

In actions performed by the user equipment in any one of the methods in FIG. 2 to FIG. 6, actions related to receiving may be performed by the receiver 701, and actions excluding sending and receiving may be performed by the processor 702.

To perform the method embodiments shown in FIG. 2 to FIG. 6, the foregoing service transfer apparatus may further include an antenna that is configured to receive and send a signal; a transmitter that sends a signal; a system bus that is configured to connect the processor 702, the receiver 701, and the transmitter (not marked in the figure); and the like.

Figure 8:
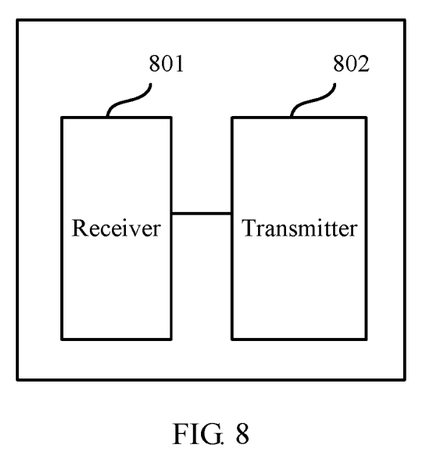
FIG. 8 is a schematic diagram of a service transfer apparatus according to a seventh embodiment of the present invention.

FIG. 8 is a schematic diagram of a service transfer apparatus according to a seventh embodiment of the present invention. The apparatus is an access network device, may be a base station or a base station controller, and may be configured to perform an action performed by a 3GPP access network device in any one of the methods in FIG. 2 to FIG. 6. For a same or similar concept and process, refer to the foregoing method embodiments; details are not described herein again in this embodiment. As shown in FIG. 8, the apparatus includes a receiver 801 and a transmitter 802.

The receiver 801 is configured to receive auxiliary information that is corresponding to a public land mobile network identity PLMN ID and sent by a core network device or a network management system, where the auxiliary information corresponding to the PLMN ID is used by the user equipment to perform service transfer to a wireless local area network WLAN that the operator allows the user equipment to access.

The transmitter 802 is configured to send the PLMN ID and the auxiliary information corresponding to the PLMN ID to the user equipment, so that the user equipment performs service transfer according to the PLMN ID and the auxiliary information corresponding to the PLMN ID.

In actions performed by the 3GPP access network entity in any one of the methods in FIG. 2 to FIG. 6, a receiving action may be performed by the receiver 801, and a sending action may be performed by the transmitter 802. To perform the method embodiments shown in FIG. 2 to FIG. 6, the service transfer apparatus may further include an antenna that is configured to receive and send a signal; a processor (not marked in the figure) that is configured to process received and transmitted signals; a system bus that is configured to connect the processor, the receiver 801, and the transmitter 802; and the like.

According to the service transfer method and apparatus provided in the embodiments of the present invention, when delivering auxiliary information of one or more WLANs to user equipment, a 3GPP access network sends a PLMN ID and auxiliary information corresponding to the PLMN ID to the user equipment, and the user equipment can identify, by using the PLMN ID, that the auxiliary information is corresponding to which operator, which avoids a service transfer failure caused by that the user equipment cannot learn auxiliary information of an operator to which the user equipment belongs, and increases a success rate of service transfer.

Persons skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A service transfer method comprising:
receiving, by a user equipment, a public land mobile network identity (PLMN ID) of a first operator to which a 3GPP access network entity belongs, and first auxiliary information corresponding to the PLMN ID of the first operator from a 3GPP access network entity, wherein the first auxiliary information is used by the user equipment to perform service transfer to a wireless local area network (WLAN) that the first operator allows the user equipment to access;

receiving, by the user equipment, a PLMN ID of a second operator that shares the 3GPP access network entity with the first operator, and second auxiliary information corresponding to the PLMN ID of the second operator from the 3GPP access network entity, wherein the second auxiliary information is used by the user equipment to perform service transfer to a WLAN that the second operator allows the user equipment to access; and performing, by the user equipment, service transfer according to the PLMN ID of the first operator and the first auxiliary information, and the PLMN ID of the second operator and the second auxiliary information;

wherein each of the first auxiliary information and the second auxiliary information comprises: a signal quality threshold of a 3GPP access network and signal quality thresholds of one or more WLANs that an operator allows the user equipment to access.

2. The method according to claim 1, wherein performing, by the user equipment, the service transfer according to the PLMN ID of the first operator and the first auxiliary information, and the PLMN ID of the second operator and the second auxiliary information comprises:

when the PLMN ID of the first operator or the PLMN ID of the second operator comprises a PLMN ID of a home operator of the user equipment, determining, by the user equipment, auxiliary information corresponding to the PLMN ID of the home operator from the first auxiliary information and the second auxiliary information; and performing, by the user equipment, service transfer according to the auxiliary information corresponding to the PLMN ID of the home operator.

3. The method according to claim 1, wherein performing, by the user equipment, service transfer according to the PLMN ID of the first operator and the first auxiliary information, and the PLMN ID of the second operator and the second auxiliary information comprises:

when a current signal quality value of the 3GPP access network that serves the user equipment is less than a signal quality threshold of the 3GPP access network, selecting, by the user equipment, a wireless local area network of which a signal quality value is greater than a signal quality threshold of the WLAN as a target wireless local area network, and transferring, by the user equipment, all services or some services of the user equipment to the target wireless local area network.

4. A user equipment, comprising:
a receiver, configured to:
receive a public land mobile network identity (PLMN ID) of a first operator to which a 3GPP access network entity belongs, and first auxiliary information corresponding to the PLMN ID of the first operator from a 3GPP access network entity, wherein the first auxiliary information is used by the user equipment to perform service transfer to a wireless local area network (WLAN) that the first operator allows the user equipment to access; and
receive a PLMN ID of a second operator that shares the 3GPP access network entity with the first operator, and second auxiliary information corresponding to the PLMN ID of the second operator from the 3GPP access network entity, wherein the second auxiliary information is used by the user equipment to perform service transfer to a WLAN that the second operator allows the user equipment to access; and a processor, configured to perform service transfer according to the PLMN ID of the first operator and the first auxiliary information, and the PLMN ID of the second operator and the second auxiliary information;

wherein each of the first auxiliary information and the second auxiliary information comprises: a signal quality threshold of a 3GPP access network and signal quality thresholds of one or more WLANs that an operator allows the user equipment to access.

5. The user equipment according to claim 4, wherein the processor is further configured to:

when the PLMN ID of the first operator or the PLMN ID of the second operator comprises a PLMN ID of a home operator of the user equipment, determine auxiliary information corresponding to the PLMN ID of the home operator from the first auxiliary information and the second auxiliary information, and perform service transfer according to the auxiliary information corresponding to the PLMN ID of the home operator.

6. The user equipment according to claim 4, wherein the processor is further configured to:

when a current signal quality value of the 3GPP access network that serves the user equipment is less than a signal quality threshold of the 3GPP access network, select a wireless local area network of which a signal quality value is greater than a signal quality threshold of the WLAN as a target wireless local area network, and transfer all services or some services of the user equipment to the target wireless local area network.

7. A service transfer method, comprising:
receiving, by a 3GPP access network entity, first auxiliary information that is corresponding to a public land mobile network identity (PLMN ID) of a first operator, from a core network device or a network management system, wherein the first auxiliary information is used by a user equipment to perform service transfer to a wireless local area network (WLAN) that the first operator allows the user equipment to access;

receiving, by the 3GPP access network entity, second auxiliary information that is corresponding to a PLMN ID of a second operator that shares the 3GPP access network entity, from the core network device or the network management system, wherein the second auxiliary information is used by the user equipment to perform service transfer to a WLAN that the second operator allows the user equipment to access; and sending, by the 3GPP access network entity, the PLMN ID of the first operator and the first auxiliary information, and the PLMN ID of the second operator and the second auxiliary information to the user equipment, to instruct the user equipment to perform service transfer according to the PLMN ID of the first operator and the first auxiliary information, and the PLMN ID of the second operator and the second auxiliary information;

wherein each of the first auxiliary information and the second auxiliary information comprises: a signal quality threshold of a 3GPP access network and signal quality thresholds of one or more WLANs that an operator allows the user equipment to access.

8. The method according to claim 7, further comprising:
associating together, by the 3GPP access network entity, a PLMN ID and the received auxiliary information corresponding to the PLMN ID.

\* \* \* \* \*